United States Patent
Stahl et al.

(10) Patent No.: US 7,569,087 B2
(45) Date of Patent: Aug. 4, 2009

(54) FILTER ELEMENT PROVIDED WITH CHANNELS OF VARIABLE DIMENSIONS AND ARRANGEMENT

(75) Inventors: Ulrich Stahl, Laudenbach (DE); Uwe Felber, Abtsteinach (DE)

(73) Assignee: Carl Freudenberg KG, Weinheim (DE)

( * ) Notice: Subject to any disclaimer, the term of this patent is extended or adjusted under 35 U.S.C. 154(b) by 329 days.

(21) Appl. No.: 11/567,491

(22) Filed: Dec. 6, 2006

(65) Prior Publication Data

US 2008/0016829 A1    Jan. 24, 2008

(30) Foreign Application Priority Data

Dec. 7, 2005   (DE) .................. 10 2005 058 612

(51) Int. Cl.
*B01D 46/52* (2006.01)
(52) U.S. Cl. ............... 55/309; 55/313; 55/497; 55/521; 210/131
(58) Field of Classification Search ............ 55/309, 55/310, 312, 313, 497, 500, 521; 210/131
See application file for complete search history.

(56) References Cited

U.S. PATENT DOCUMENTS

| | | | | |
|---|---|---|---|---|
| 3,077,715 A | * | 2/1963 | Carroll | .............. 55/310 |
| 3,146,197 A | * | 8/1964 | Getzin | ............ 210/493.1 |
| 3,556,298 A | * | 1/1971 | Huebner et al. | .............. 210/131 |
| 4,537,812 A | * | 8/1985 | Elbers | .............. 428/182 |
| 4,799,944 A | | 1/1989 | Dixon et al. | |
| 4,925,561 A | * | 5/1990 | Ishii et al. | .............. 210/493.3 |
| 5,051,118 A | | 9/1991 | Andreae | |
| 5,252,111 A | * | 10/1993 | Spencer et al. | .............. 55/489 |
| 5,743,927 A | * | 4/1998 | Osendorf | .............. 55/497 |
| 5,840,094 A | * | 11/1998 | Osendorf et al. | .............. 65/27 |
| 6,544,310 B2 | * | 4/2003 | Badeau et al. | .............. 55/385.3 |
| 6,592,643 B2 | * | 7/2003 | Shah et al. | .............. 55/497 |
| 6,673,136 B2 | * | 1/2004 | Gillingham et al. | .............. 95/273 |
| 7,329,326 B2 | * | 2/2008 | Wagner et al. | .............. 156/205 |
| 7,393,372 B2 | * | 7/2008 | Cassell et al. | .............. 55/310 |

FOREIGN PATENT DOCUMENTS

| | | |
|---|---|---|
| DE | 3879533 | 8/1993 |
| DE | 69005688 | 7/1994 |

* cited by examiner

*Primary Examiner*—Duane Smith
*Assistant Examiner*—Robert A Clemente
(74) *Attorney, Agent, or Firm*—Grossman, Tucker, Perreault & Pfleger, PLLC

(57) ABSTRACT

A filter element comprises a filter medium (1) with an inflow and an outflow side wherein at least one channel (2) which is variable in its dimensions is associated to the filter medium (1). An arrangement comprises a filter element and a flow channel, wherein the flow channel can be at least partially closed and opened by means of the filter element. Such a filter element and such an arrangement solve the objective to realize a filter system which ensures an engine-friendly operation mode and a long service life of the filter element.

8 Claims, 1 Drawing Sheet

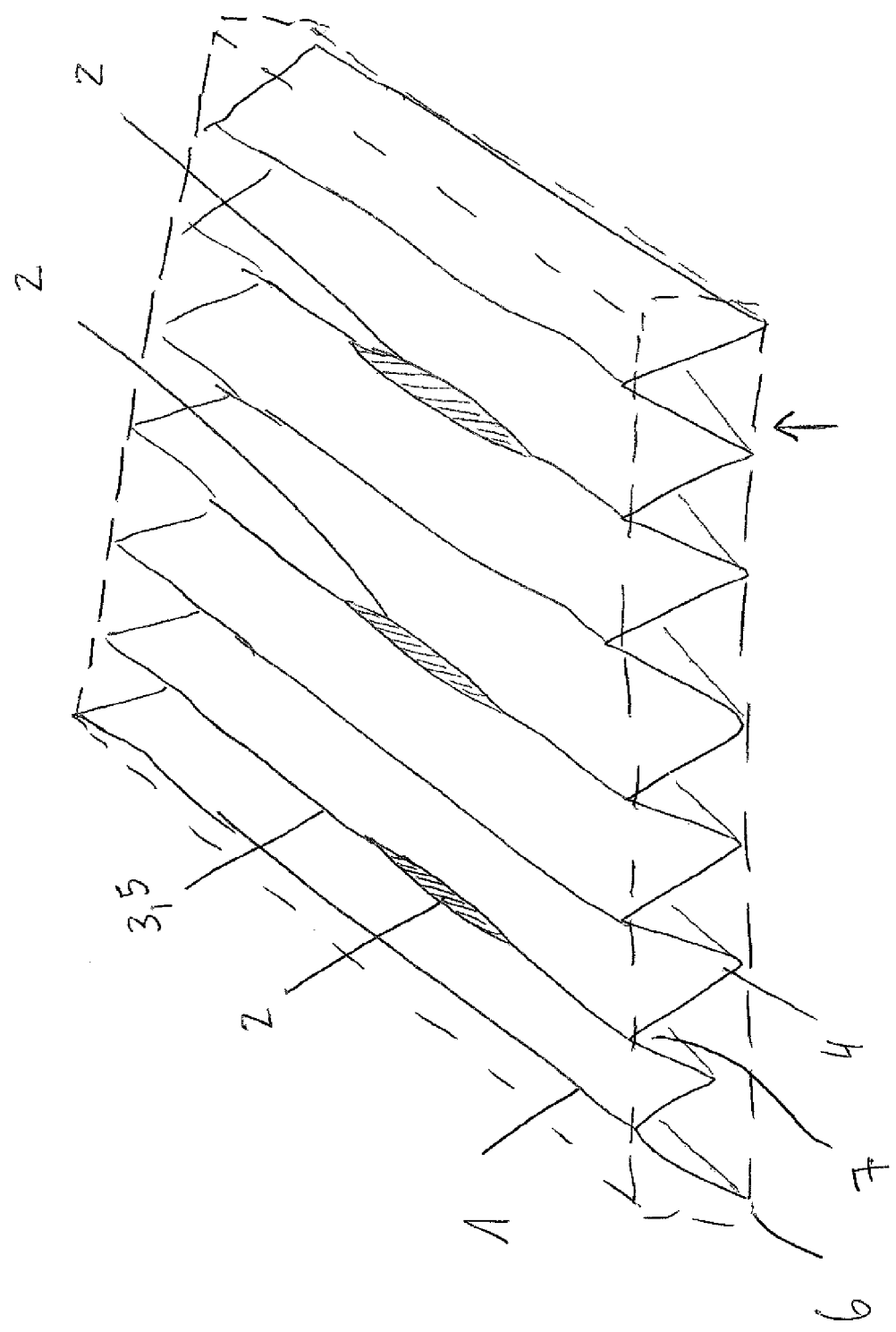

FILTER ELEMENT PROVIDED WITH CHANNELS OF VARIABLE DIMENSIONS AND ARRANGEMENT

TECHNICAL FIELD

The invention relates to a filter element and an arrangement thereof.

PRIOR ART

Filter elements are used in motor vehicles as emission filters. Therein, the filter elements have the objective to prevent the exhaust escape of engine gases into the atmosphere. The gases and vapours escaping from the engine pass through the filter element wherein environmentally harmful substances are retained in the filter element. The filter element fulfills this function during the standstill of the motor vehicle. During the driving mode of the motor vehicle the filter element represents an obstacle in the intake stroke of the engine that contributes to unintended pressure differentials.

The quantity of air which can be taken in by an engine at a certain performance level is a function of the pressure differential between the inflow and the outflow side of the filter element. A very large pressure differential is generated when a large negative pressure is built up on the engine side in order to take in air from the atmosphere.

Said occurring pressure differentials not only are disadvantageous for the engine, but they also reduce the service life of the filter element. Legal regulations establish that a filter element, once it has been installed, is supposed to have a service life of 15 years.

The filter elements known in the prior art meet said requirements only in an insufficient manner and are thus, as described before, disadvantageous for the engine of a motor vehicle.

DESCRIPTION OF THE INVENTION

Therefore, the invention is based on the objective to realize a filter system which ensures an engine-friendly operation mode and a long service life of the filter element.

The present invention solves the aforementioned objective by the features described herein. According thereto, a filter element comprises a filter medium with an inflow and an outflow side wherein at least one channel which is variable in its dimensions is associated to the filter medium.

According to the invention it was discovered that one or more channels which are variable in their dimensions allow for generating a single-sided flow permeability. The air taken in from the atmosphere by the engine of a motor vehicle can be let through channels in intake direction which are relatively wide opened. Appropriately large dimensions of the channels prevent the generation of a large pressure differential between the inflow and the outflow side of the filter element. Thus, in the driving mode of the motor vehicle, the dimensions of the channels can be adjusted as required. When the vehicle stands still, the dimensions of the channels can be adjusted such that gases escaping from the engine chamber into the atmosphere are almost completely retained and filtered by the filter element. A filter element provided with a channel generates a first defined pressure differential between the inflow and the outflow side at a certain air mass flow. An identical filter element without channels generates a second pressure differential. According to the invention it was found that during the examined air mass flows, the first pressure differential was always much smaller than the second pressure differential. Thus, the design according to the invention ensures that the filter element is not subject to large pressure differentials and thus is not charged with large forces. Thus, the service life of the filter element is strongly increased. Furthermore, an engine-friendly operation mode is ensured since the channels allow the intake air of the engine a nearly free flowing.

Thus, the above mentioned objective is solved.

In a particularly constructive embodiment, the filter medium could be at least partially and reversibly deformable. By means of this specific embodiment, it is possible to deform the filter medium by the occurring pressure differentials. The forces acting on the filter medium by means of the pressure differentials can provoke a reversible deformation of the filter medium. Once the pressure differentials have been deleted, the original form of the filter element is reestablished.

By means of partially deforming the original form of the filter medium the channels could be at least partially widened or opened and they could be at least partially closed by the restoration of the original form. In said embodiment, no complex devices which adjust the dimensions of the channels are used. Only the pressure differentials caused by the intake performance of the engine are capable of adjusting the dimensions of the channels. Concretely, a negative pressure on the engine side leads to an intake of the filter medium and to its deformation regarding its original form. Herein, the channels are opened or widened. Once the pressure differential has been reduced, in particular when the engine is turned off, the filter medium returns into its original form and closes the channels at least partially. Thus, the areas of the filter medium which are perforated by the channels can at least partially bear on each other and form a loose arrangement. This loose closing of the filter medium is sufficient, since the media flowing out of the engine into the atmosphere do not have a high flow velocity and accumulate on the filter medium as billowing fog or vapour. The filter element quasi acts as check valve or as flow diode which is highly permeable in one direction and only slightly permeable in the other direction.

The filter medium could be designed as at least one layer with projections and depressions. This specific design allows for the generation of restoring forces when the filter medium is deformed regarding its original form.

Against this background, it is possible that the filter medium is designed as folded layer. Due to the formation of folds, the filter medium is provided with a particularly high stability and an efficient filter surface. Furthermore, a folded layer can be deformed regarding its original form by means of relatively low forces, since the folds act as the areas to be deformed and since the filter medium can particularly well receive the flow medium thanks to the spaces between the folds.

The filter medium could be designed as wavelike layer. Thanks to the wavelike form, a comparatively high restore force can be generated, maintaining a as flat design as possible.

The channels could be associated to the projections. Said design is advantageous as far as the flows are concerned since the flow medium is directed towards the projections by means of channels. The flow medium is guided by means of two flanks of the filter medium, respectively, defining the projection. If the filter medium is provided with folds, the channels could be associated to the backs or respectively the peaks of the folds. Thus a particularly simple opening and closing of the channels or respectively a widening of the channels is rendered possible, since when the filter medium is deformed, the fold peaks are most affected by the deformation. Furthermore, the flow medium accumulates in the V-shaped pools between the fold peaks and can be sucked through from there. Correspondingly, said embodiments apply to a filter medium which is designed as wavelike layer when the channels are arranged in the highest projections of the wave crests.

The channels could be designed as longitudinal slots. This specific design ensures that the channels can be opened or closed without difficulty. Slots have the advantage that their dimensions can be highly increased by the deformation of the filter medium. Herein, it is possible that the longitudinal slots extend along a fold or that several longitudinal slots which are separated from each other are arranged in one fold back or one fold peak. Against this background, it is also possible that only each second, third or fourth fold is provided with a longitudinal slot or with several longitudinal slots. Depending on the pressure differentials caused, the number of longitudinal slots per fold number can be adjusted.

The filter medium could be designed as nonwoven. As far as their porosity is concerned, nonwovens can be adjusted without difficulty. Furthermore, nonwovens are easily available in commerce. The filter medium could be designed as layer which consists of several plies. Herein, it is possible that the filter medium is designed as laminated nonwoven. The lamination provides the advantage that the nonwoven is stabilized. Furthermore, a multilayered structure has the advantage that the single layers can have different filtering functions.

The filter medium could comprise substances which adsorb hydrocarbons. This concrete design allows for the use of the filter element as hydrocarbon emission filter, namely as what is called HC-emission filter. Against this background, it is possible that activated carbon is used as substance which adsorbs hydrocarbons. Said activated carbon could be associated to the filter medium in the form of granules, of fibres or of pellets. The use of granules allows for adjusting high specific adsorbing surfaces. As far as a combination of the activated carbon with the present nonwoven fibres is concerned, the use of fibres is suitable. Pellets are characterized in that they can be easily processed. The use of zeolites is also possible, since said substances are cost-efficient and provide a large adsorbing surface. Against this background, substances which adsorb hydrocarbons could be arranged as coating on the filter medium. A coating allows for a homogeneous arrangement of the substances on the whole filter medium.

The filter elements described herein could be designed as flat filter. This specific design allows for the positioning of the filter elements in flat housings. Furthermore it is possible that the filter elements described herein are designed as star filters or as star filter cartridges.

Filter elements of said design are characterized by a high stability and can be used in the liquid filtering.

The filter elements described herein could be provided with a frame consisting of plastics or of the filter medium itself. Due to the plastics, the filter elements are provided with a high stability. Frames consisting of the filter medium lead to filter elements which can be flexibly deformed and can be inserted into bent and complexly shaped housings.

Furthermore, the mentioned objective is solved by an arrangement which comprises a filter element and a flow channel wherein the flow channel can be at least partially closed and opened by means of the filter element.

According to the invention, it has been discovered that the occurring pressure differentials between the inflow and the outflow side of the filter medium can be eliminated by means of such an arrangement.

The flow channel could be closed and deblocked by means of a mobile filter element. Herein, the filter element could be arranged such that it is pivotable around an axis and that, due to the intake, it can be pivoted such that the flow channel is deblocked. Subsequent to the action of the intake forces, the filter element can return into its original position, namely the closing position, due to gravity.

There are different possibilities to improve and to specify the technical teaching of the present invention in an advantageous manner. For that purpose, reference has to be made to both the dependant claims following patent claim 1 and to the following description of a preferred exemplary embodiment of the invention by means of the drawing. In relation with the illustration of the preferred exemplary embodiment of the invention by means of the drawing, generally preferred designs and features of the technical teaching are also described.

BRIEF DESCRIPTION OF THE DRAWINGS

In the drawing the only FIGURE displayed shows a schematic view of a filter element.

EMBODIMENT OF THE INVENTION

The only FIGURE shows a schematic view of a filter element with a filter medium 1 with an inflow and an outflow side, wherein channels 2 which are variable in their dimensions are associated to the filter medium 1.

The filter medium 1 can be deformed at least in sections and in a reversible manner. The channels 2 can be at least partially opened or widened by the partial deformation of the original form of the filter medium 1 and can be at least partially closed by reestablishing the original form.

The filter medium 1 is designed as layer with projections 3 and depressions 4. Herein, the filter medium 1 is designed as folded layer wherein the channels 2 are associated to the fold backs or respectively to the fold peaks 5. Between the fold peaks 5 are generated V-shaped pools 7.

The channels 2 are designed as longitudinal slots. In the specific exemplary embodiment, a channel 2 in form of a longitudinal slot is associated to every second fold peak 5.

The filter medium 1 is designed as nonwoven to which substances adsorbing hydrocarbons are associated.

Dotted lines indicate the frame elements 6.

The filter element is installed in a motor vehicle such that the slots 2 of the fold peaks 5 face the engine. Consequently, the air flows in the direction of the arrow when the engine is turned on. When the engine is turned off, the flow direction is reversed and the inflow and outflow sides are interchanged.

As far as further advantageous designs and features of the technical teaching according to the invention are concerned, reference is made to both the general part of the description and to the accompanying patent claims. Concluding, it should be particularly emphasized that the foregoing arbitrarily selected exemplary embodiment is only intended to describe the technical teaching according to the invention rather then limiting it to this exemplary embodiment.

What is claimed is:

1. Filter element comprising a filter medium with an inflow and an outflow side wherein at least one channel which is variable in its dimensions is associated to the filter medium, characterized in that said filter medium is designed as a layer with projections and depressions and that said at least one channel is associated to at least one of said projections and that said at least one channel is designed as a longitudinal slot.

2. Filter element according to claim 1, characterized in that said filter medium can be deformed at least in sections and in a reversible manner.

3. Filter element according to claim 1, characterized in that said at least one channel can be at least partially opened by means of a partial deformation of the original form of said filter medium and can be at least partially closed by re-establishing the original form.

4. Filter element according to claim 1, characterized in that said filter medium is designed as folded layer.

5. Filter element according to claim 1, characterized in that said filter medium is designed as wavelike layer.

6. Filter element according to claim 1, characterized in that said filter medium is designed as nonwoven.

7. Filter element according to claim 1 characterized in that said filter medium comprises substances which adsorb hydrocarbons.

8. Arrangement comprising a filter element and a flow channel, wherein the flow channel can be at least partially closed and opened by means of the filter element wherein said filter element comprises a filter medium with an inflow and an outflow side wherein said flow channel which is variable in its dimensions is associated to said filter medium, characterized in that said filter medium is designed as a layer with projections and depressions and that said flow channel is associated to at least one of said projections and that said flow channel is designed as a longitudinal slot.

* * * * *